Patented Nov. 8, 1932

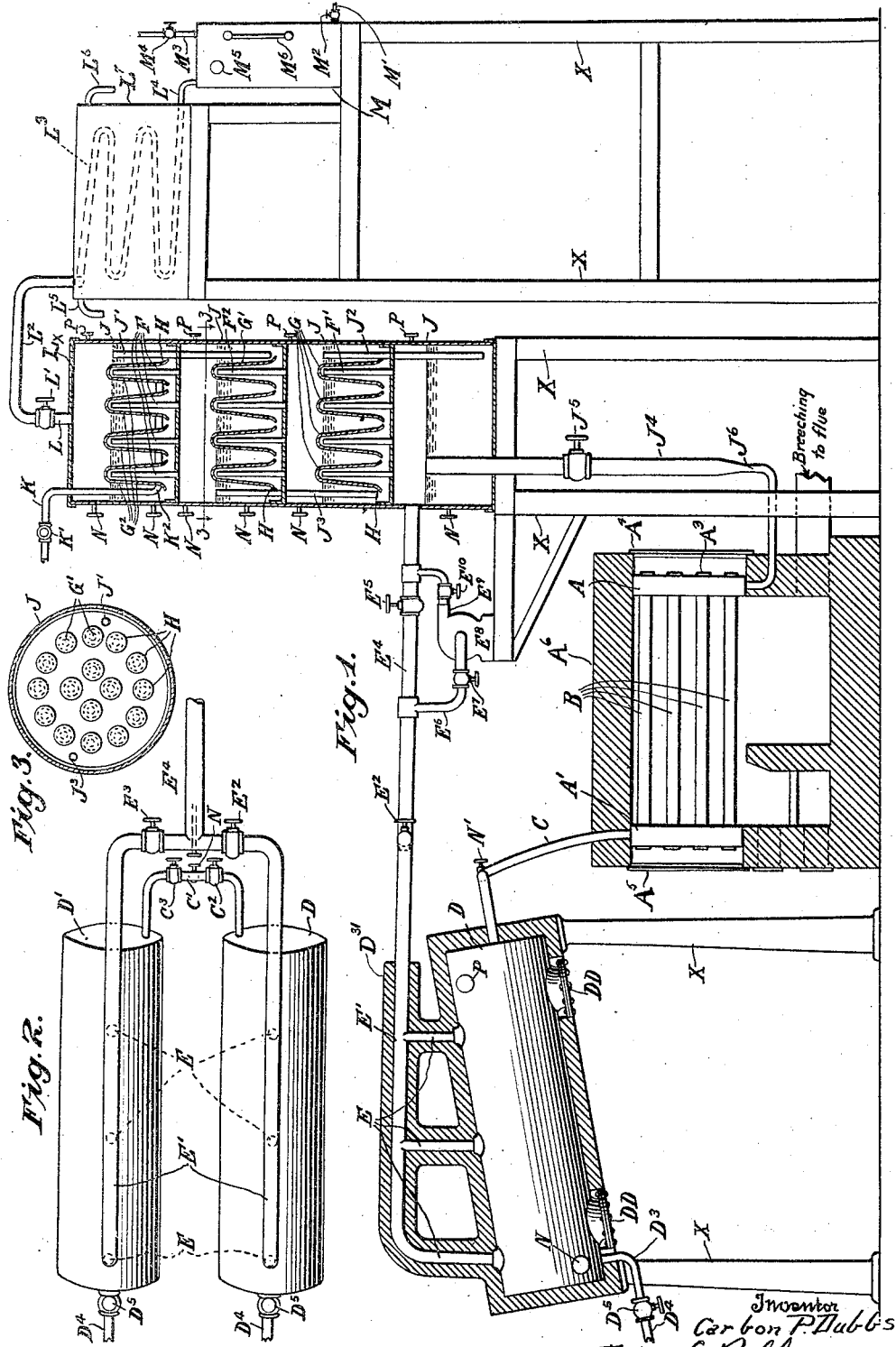

1,886,946

UNITED STATES PATENT OFFICE

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA

APPARATUS FOR TREATING PETROLEUM

Original application filed June 21, 1919, Serial No. 305,793. Divided and application filed September 6, 1921, Serial No. 498,887. Again divided and this application filed July 1, 1925, Serial No. 40,804. Renewed August 19, 1929.

This application is a division of my copending application Serial No. 498,887, filed Sept. 6, 1921, which application is a division of an original application filed June 21, 1919, Serial No. 305,793, upon which Patent 1,488,325 was issued March 25, 1924.

This invention relates to an apparatus for treating petroleum and other hydrocarbons to produce therefrom products having lower boiling points.

The invention contemplates an apparatus for continuously treating petroleum; an apparatus whereby petroleum is passed through a heating zone, then through a vaporizing chamber, wherein part of it remains liquid containing such solids originally in the oil or formed while being heated, the liquid being intermittently or continuously drawn from such vaporizing chamber and carrying with it more or less of the solid matter; an apparatus in which the vapors liberated in the vaporizing zone are passed through a series of pools of liquid oil subjecting the vapors to a dephlegmating action; an apparatus in which the circulation of the vapors may be controlled by a pump interposed in the vapor line; an apparatus which utilizes the raw oil as a reflux condensing agent, the reflux condensate combining with the raw oil prior to its being introduced to the heating zone; an apparatus whereby an increased amount of the heat generated is utilized in the system; an apparatus in which the raw oil is caused to circulate down through successive pools maintained in the dephlegmator, subjecting the vapors bubbling therethrough to a refluxing action, the raw oil and condensate being drawn off from the bottom of the dephlegmator; an apparatus whereby the oil under treatment is heated in one stage and such heat treatment so controlled and regulated as to prevent any substantial deposition of carbon in such zone; and apparatus in which the oil to be treated is fed continuously or intermittently by passing it through succeeding pools of oil before being passed to the cracking tubes, such oil being freed of that portion having the desired low boiling points while dephlegmating the vapors in said pools; and in general to provide an improved apparatus of the character referred to.

In the drawing:

Fig. 1 is a diagrammatic side elevation in section of my improved apparatus.

Fig. 2 is a top plan view of the vaporizing chambers and the immediate piping.

Fig. 3 is a top cross sectional view of that section of Fig. 1, in which the pools of oil are shown. This is a cross section taken on the line 3—3 of Fig. 1.

In describing the attached drawing, and operation of the apparatus, the oil to be treated is drawn from a source (not shown), and is forced into the apparatus through valve marked K—1, through line K, through the perforated line K—2, which latter line extends across the bottom of the top pool of oil in the chamber marged L—x. The oil vapors which percolate up through this pool of oil are passed off through vapor line L, through the pressure regulating valve L—1, through gooseneck L—2, to condensing coil L—3 positioned in condensing tank L—7, thence through line L—4 into tank M, along with the incondensable gases. Water is fed to tank L—7 through line L—5 and travels out of said tank through line L—6. The condensate collected in tank M is drawn off through line M—1 having positioned thereon pressure regulating valve M—2, while the incondensable gas is drawn off through line M—3 through pressure regulating valve M—4 and on this tank is a liquid level gauge M—6 and a pressure gauge M—5. Tanks M and L—7 rest on the supports marked X.

The level of the top pool of oil in the chamber L—x is maintained approximately at J and any surplus flows through pipe J—1 into the pool of oil directly thereunder, the level of this pool being maintained at point marked J. Any excess travels through line J—3 into the bottom of the pool of oil immediately thereunder, the level of the oil in each pool being maintained at the points indicated J and any excess travelling through the line J—2 into the pool of oil immediately thereunder and this pool is maintained at a level marked J and any excess travels through line J—4, having positioned on it valve J—5.

At the bottom of line J—4, the cross sectional area is reduced as shown at J—6, the larger sized pipe used in J—4 being for the purpose of allowing the oil to be, more or less, freed of any vapors contained therein, such vapors passing back up through said pipe into the bottom of the chamber L—x. The remaining liquid passes through line J—6 into header A, and passes through lines B into header A—1. In each of these headers opposite each end of the tubes B are positioned plugs A—3 for the purpose of allowing entry to said tubes for cleaning same and opposite these plugs are furnace doors A—4 and A—5 which by opening give ready access to said plugs.

The tubes B and headers A and A—1 are positioned in the furnace A—6. As the oil passes through these tubes B from header A into header A—1, it is subjected to heat, which converts a portion into lower boiling point products, and the oil flows from header A—1 through line C, into header C—1, having positioned therein pyrometer N and through valve C—2 into retort D, which retort has manholes marked D—D, pressure gauge P.

As the oil passes through tank D, a proportion of same is vaporized and passes up through vapor lines E into header E—1, and through valve E—2 into line E—4. Through the line E—4, the valve E—5 being opened while the valves E—7 and E—10 are closed, the vapors pass into the bottom compartment of the chamber L—x. Any proportion condensing drains into the bottom compartment of chamber L—x, and is automatically returned to the heating tubes B through line J—4, valve J—5 being open. The uncondensed portion passes up through the pipes marked F—1 and by means of caps G are forced downwardly and discharged near the bottom into the pool of oil in that chamber. The bottoms of the caps marked G are perforated at the points marked H. The vapors as they bubble up through this pool of oil give up more or less of their heat and more or less of the vapors are condensed and as they bubble up through this liquid, they are more or less scrubbed. The excess oil accumulated in this pool travels through pipe J—2 into the pool of oil contained in the compartment directly thereunder, the pipe J—2 extending down into the pool of oil to a point near the bottom, thus forming a liquid seal so that no vapors contained in the lower chamber can pass up through pipe J—2 into the upper chamber. The remaining vapors pass up through pipes F—2 and are forced by means of caps G—1 downwardly to a point near the bottom of the pool of oil contained in this chamber and there escape into said pool of oil through the perforations at a point marked H in said caps or if these are not of sufficient capacity, the excess vapors can pass clear down under the bottom of the caps and escape up through the oil from that point.

As such vapors percolate up through this pool of oil, more or less of the heat in same is extracted and acquired by the pool of oil, thus causing more or less of the vapors to condense and be retained in such pool of oil and act to have a scrubbing effect on remaining vapors. The surplus oil accumulating in this chamber travels through pipe J—3 into the pool contained in the chamber immediately thereunder, such pipe extending to near the bottom of said latter pool, so as to prevent any vapors passing therethrough from the latter chamber up into the former chamber. The remaining vapors in the last mentioned pool pass up through pipes F and by means of caps G—2 are forced down to near the bottom of the pool of oil contained in this chamber and are there discharged into said pool of oil through the perforated places marked H or by passing completely under the bottom of caps G—2 and as they percolate up through this pool of oil, more or less heat is extracted therefrom and retained in the oil forming this pool, which causes more or less of such vapors to be condensed and retained in this pool of oil and the surplus of such oil overflows through pipe J—1 into the pool immediately thereunder, being discharged in said pool near the bottom so as to prevent any vapors in said lower chamber passing through this pipe into the upper chamber. There may be as many pools of oil as are shown in the chamber L—x or as desired or found necessary to sufficiently scrub the vapors passed therethrough and to reduce and condense any desired portions of the vapors to produce the desired boiling point, the remaining vapors passing from said chamber L—x through pressure regulating valve L—1, through gooseneck L—2 as already described. These pools of oil may be contained in one chamber as shown in the drawing and marked L—x or in more than one chamber. The excess oil in the bottom pool of each chamber being returned to the heating pipes B in the same manner as shown in the drawing, and as this will be readily understood by those versed in the art, I have not deemed it necessary to show more than one chamber marked L—x.

In case it is desired to stimulate the flow of vapors from the vaporizing chamber into and through the chamber L—x, a pump is provided marked E—8 and connected to the vapor line E—4 by means of line E—6, having positioned on it valve E—7 and on the discharge side of the pump it is connected to vapor line E—4 by line E—9, having positioned on it valve E—10. To use this pump for pumping, the valve E—5 in line E—4 would be closed and valves E—7 and E—10 would be opened, and the pump put in operation, thereby causing the vapors to travel from line E—4 through line E—6, through pump E—8, through E—9, back into line E—4 on the opposite side of the valve E—5 from which the vapors were originally drawn from line E—4.

In different parts of the apparatus are shown pyrometers marked N and pressure gauges marked P. The chamber L—x and pump E—8 are positioned on supports marked X. The portion of oil in the vaporizing chamber D remaining unvaporized is drawn off either continuously or intermittently through line D—3, through valve D—5 and with it is carried off more or less of the carbon formed in the cracking of the oil. Vaporizing chamber D is duplicated, as shown, in vaporizing chamber marked D—1. This is for the reason that when it becomes necessary to clean vapor chamber D, the rest of the apparatus can be kept in operation by diverting the flow of heated oil coming from the heating tubes B into the other vaporizing chamber D—1 by the opening of valve C—3 and the vapors passed therefrom by the opening of valve E—3. The unvaporized portion in tank D—1 is drawn off through valve D—5 through line D—4 and the discharge of the heated oil into tank D is stopped by the closing of valves C—2. In due time, the manholes marked D—D on this latter tank can be opened and the tank cleaned; said tank will be ready to be put back in service by the time it becomes necessary to clean tank D—1, this being done by the closing of valves C—3, and E—3 and the opening of valves C—2 and E—2. These vapor chambers are supported by supports marked X. Said vaporizing chambers and vapor lines marked E and section of vapor lines marked E—1 are heavily insulated as indicated by D—31 in Fig. 1. The purpose of such insulation is for preventing loss of heat from this section and to prevent any portion of the oil, after once being vaporized, from condensing and mixing with that portion remaining in the vapor chamber unvaporized. These vapor chambers are maintained only partly full of oil.

It will be noted that the raw oil is fed into the top or last pool of oil in the chamber L—x, which is of the lowest temperature and flows from there into the next succeeding pool of oil, which is higher in temperature and then to the next, which is still higher, etc., thus being progressively subjected to increasing temperatures and also mixed with such oils as are condensed in these pools of oil and such mixture returned for further heating. Thus, the raw oil being fed in is being preheated before passing to the heating coils B and thus utilizing more or less of the heat given up by the vapors. It is to be noted that by this novel arrangement the raw oil feed through the pools is preheated, and also the condensate resulting from the condensation of heavier vapors maintained in a hot condition. The oil accumulating in the dephlegmator is discharged to the cracking coil through the line J—4.

Among other advantages of this process are the control of the amount of cracking done on each passage of the oil through the heating or cracking tubes B, the separation and withdrawal from the apparatus of the unvaporized portion remaining in the vapor chamber along with more or less of the carbon formed the fractional condensing of the vapors generated and the return to the heating tubes of those fractions of not sufficiently low-boiling point. These fractions which are returned to the heating tubes represent the reflux condensate and do not have any free carbon content.

It will also be observed that in this arrangement, great economy in fuel will be gained. The temperature to which the oil is heated may vary from a minimum of 200 degrees F. to 600 degrees F., and from a maximum of 600 degrees F. to 1500 degrees F. While the pressure maintained may vary from minimum to a few pounds to the square inch to a maximum of 800 pounds to the square inch. These ranges of temperature and pressure are by no means arbitrary.

I claim:

1. In an apparatus for converting hydrocarbon oil, the combination with a furnace having a heating coil disposed therein, a plurality of enlarged chambers disposed outside of said furnace, means for establishing direct communication between said coil and either of said enlarged chambers whereby heated hydrocarbons may be passed directly from the heating coil through one of said chambers until substantial coke deposition occurs therein and then diverted to the other chamber, means for preventing a substantial decrease in the temperature of the oil in either of said chambers, a vapor transfer line communicating with each chamber, dephlegmating means communicating with said transfer line, a pump adapted to be placed in communication with said vapor transfer line, and means for bypassing said pump, means for collecting separated pools of charging oil in said dephlegmating means, means for passing vapors through said dephlegmating means in heat transfer relation with said pools of charging oil, means for passing charging oil from said pools and reflux condensate separated from the vapors in said dephlegmating means to said heating coil for further cracking, and means for maintaining a superatmospheric pressure on the oil undergoing conversion in the apparatus.

2. In an apparatus for cracking hydrocarbon oil, comprising a furnace having a heating coil disposed therein, a plurality of enlarged chambers disposed outside of said furnace, a common header in communication with said chambers, a transfer line connecting said coil with said header, means positioned in said header for selectively directing oil from the coil to any one of said enlarged chambers, a vapor header in communication with each of said chambers, a vapor transfer line connected to said header, dephlegmating means in communication with said transfer line, means positioned in said vapor header for establishing direct communication from any one of said chambers to said dephlegmating means, a pump interposed in said vapor transfer line, and means for bypassing said pump, means for introducing charging oil to the dephlegmating means, means for supplying unvaporized charging oil and reflux condensate from the dephlegmating means to the heating coil, and means for maintaining a superatmospheric pressure on the oil undergoing treatment in the apparatus.

CARBON P. DUBBS.